United States Patent
Fotouhie

(10) Patent No.: US 10,597,144 B2
(45) Date of Patent: Mar. 24, 2020

(54) UNDER THE WING-MOUNTED JET ENGINE WITH PIVOTAL SWIVEL JOINT TO PRODUCE DIRECTIONAL THRUST VECTORING THRU SWIVEL ANGLE

(71) Applicant: Hadie Fotouhie, Albuquerque, NM (US)

(72) Inventor: Hadie Fotouhie, Albuquerque, NM (US)

(*) Notice: Subject to any disclaimer, the term of this patent is extended or adjusted under 35 U.S.C. 154(b) by 168 days.

(21) Appl. No.: 15/828,548

(22) Filed: Dec. 1, 2017

(65) Prior Publication Data

US 2019/0168861 A1 Jun. 6, 2019

(51) Int. Cl.
*B64C 15/12* (2006.01)
*B64D 27/18* (2006.01)
*B64D 27/26* (2006.01)

(52) U.S. Cl.
CPC .............. *B64C 15/12* (2013.01); *B64D 27/18* (2013.01); *B64D 27/26* (2013.01); *B64D 2027/262* (2013.01)

(58) Field of Classification Search
CPC ......... B64C 15/02; B64C 15/12; B64D 27/04; B64D 27/06; B64D 27/16; B64D 27/18; B64D 27/20; B64D 27/26; B64D 2027/262; B64D 2027/264; B64D 2027/266
USPC ...................................................... 244/12.4
See application file for complete search history.

(56) References Cited

U.S. PATENT DOCUMENTS

| | | | | |
|---|---|---|---|---|
| 3,000,594 A | * | 9/1961 | Madelung | B64C 29/0075 244/12.4 |
| 3,099,420 A | * | 7/1963 | Messerschmitt | B64C 29/0075 244/12.4 |
| 3,559,926 A | * | 2/1971 | Fruhauf | F02K 1/004 244/56 |
| 4,560,122 A | * | 12/1985 | Parkinson | B64D 27/18 244/54 |
| 5,181,675 A | * | 1/1993 | Lardellier | B64D 27/18 244/54 |
| 5,775,638 A | * | 7/1998 | Duesler | B64D 27/18 244/54 |
| 5,803,776 A | * | 9/1998 | Slynko | B60V 1/08 440/49 |
| 6,719,244 B1 | * | 4/2004 | Gress | B64C 29/0033 244/17.25 |

(Continued)

FOREIGN PATENT DOCUMENTS

GB 870739 A * 6/1961 .............. B64C 3/38

*Primary Examiner* — Joshua E Rodden

(57) ABSTRACT

During flight of a jet aircraft the essential steering movements, such as roll, pitch and yaw maneuvers, are normally performed via control surfaces on its wings and its tail sections. This invention allows for swiveling of jet engines mounted under wings of the jet aircraft, to direct exhaust gases upward, downward or sideways to some limited extent to achieve more agile air maneuvers compared to traditional fixed under the wing-mounted jet engines. The idea of performing more agile air maneuvers is realized by swiveling and pivoting the jet engine under the wings of the jet aircraft about a pivot point mounted along an engine nacelle to enable highly efficient pitch and roll motions in flight, as well as making efficient and agile yaw type motion in flight by swiveling and pivoting the jet engines underneath the wings.

6 Claims, 8 Drawing Sheets

(56) References Cited

U.S. PATENT DOCUMENTS

| | | | | |
|---|---|---|---|---|
| 7,766,275 B2* | 8/2010 | Hawley | ............... | B64C 15/12 |
| | | | | 244/36 |
| 8,820,676 B2* | 9/2014 | Cazals | ............... | B64C 15/12 |
| | | | | 244/56 |
| 8,931,729 B2* | 1/2015 | Abde Qader Alzu'bi | ............... | |
| | | | | B64C 27/20 |
| | | | | 244/17.13 |
| 9,567,090 B2* | 2/2017 | Gallet | ............... | B64D 27/12 |
| 10,301,030 B2* | 5/2019 | Castelli | ............... | B64D 27/26 |
| 2005/0230520 A1* | 10/2005 | Kusic | ............... | B64C 27/08 |
| | | | | 244/12.4 |
| 2008/0073461 A1* | 3/2008 | Guibert | ............... | B64D 27/26 |
| | | | | 244/54 |
| 2011/0121132 A1* | 5/2011 | Crook | ............... | B64D 27/18 |
| | | | | 244/54 |
| 2011/0127371 A1* | 6/2011 | Takeuchi | ............... | B64D 27/18 |
| | | | | 244/54 |
| 2011/0192933 A1* | 8/2011 | Guering | ............... | B64C 15/12 |
| | | | | 244/54 |
| 2015/0048201 A1* | 2/2015 | Takeuchi | ............... | B64D 27/26 |
| | | | | 244/54 |
| 2018/0162541 A1* | 6/2018 | Jasklowski | ............... | B64D 27/26 |
| 2019/0152616 A1* | 5/2019 | Pautis | ............... | B64D 27/26 |
| 2019/0161198 A1* | 5/2019 | Combes | ............... | B64D 27/26 |

* cited by examiner

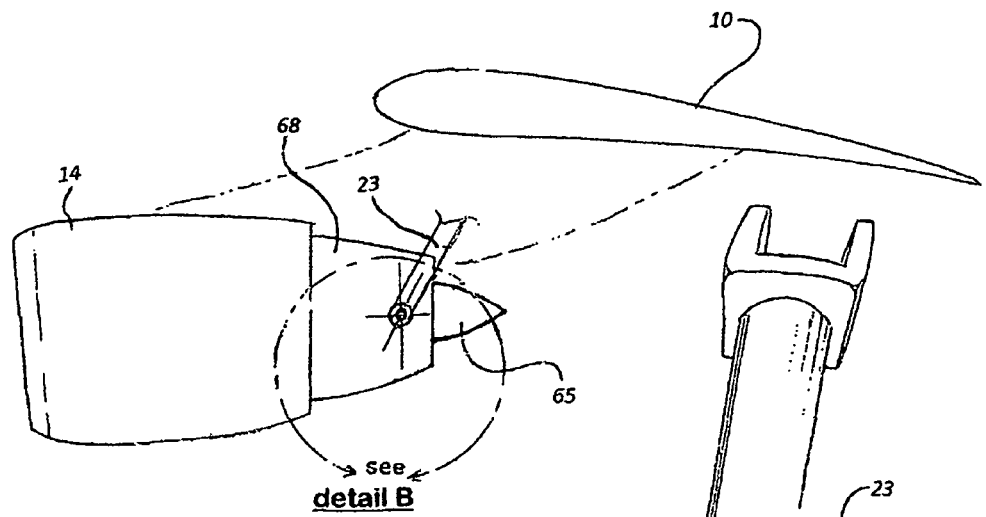
FIG. 6
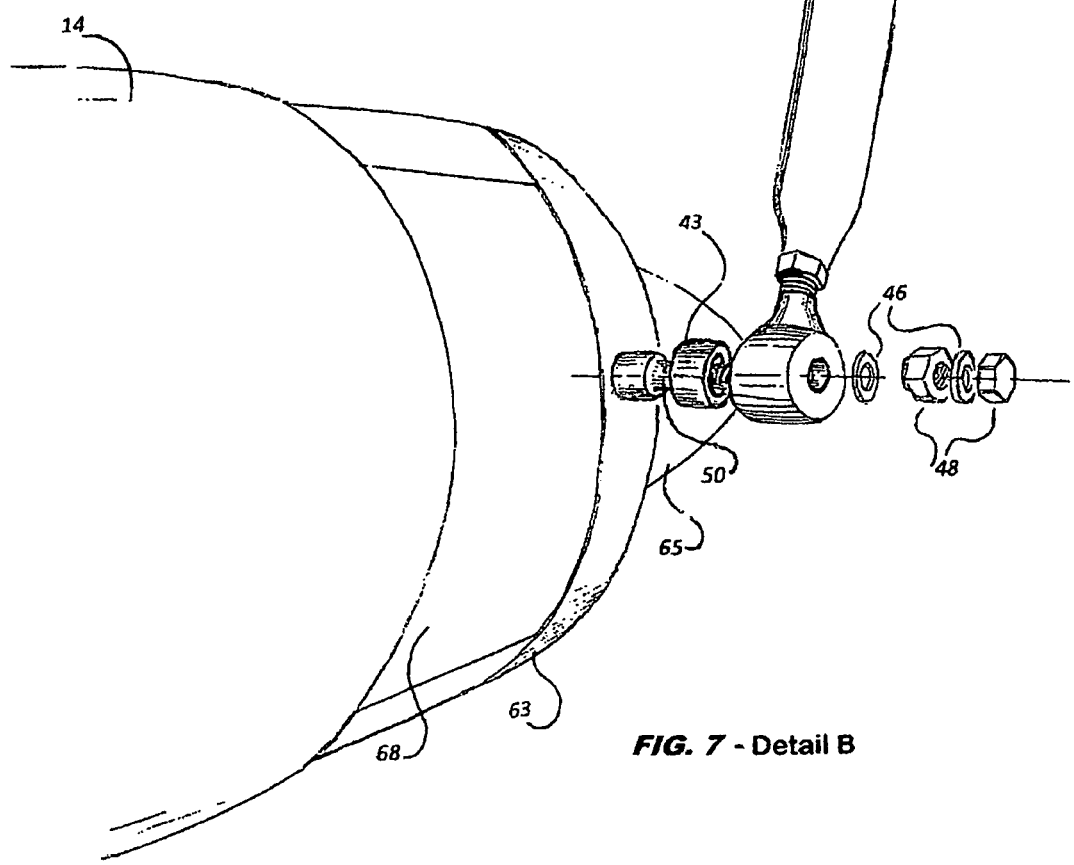
FIG. 7 - Detail B

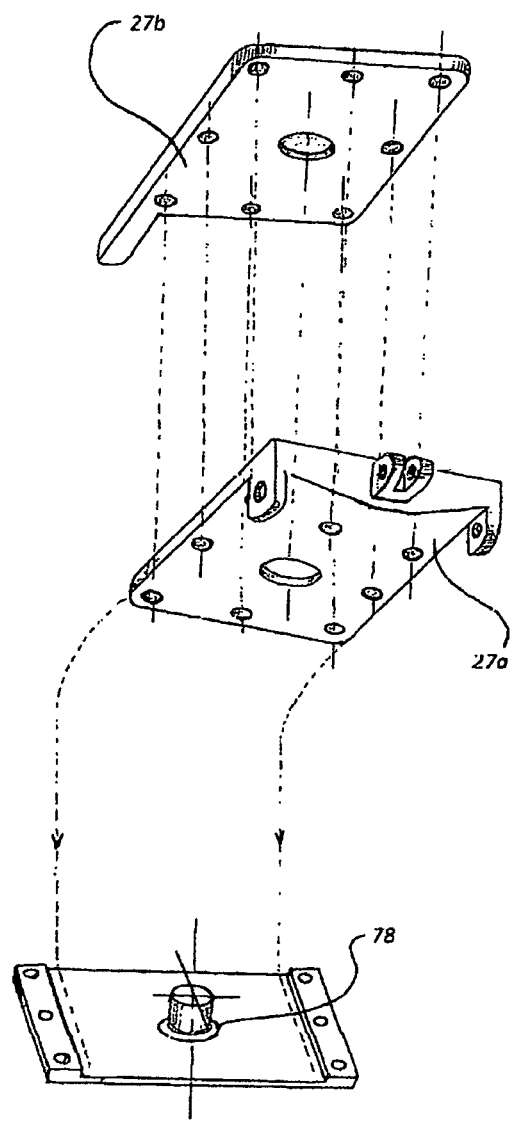
FIG. 8 - Detail A

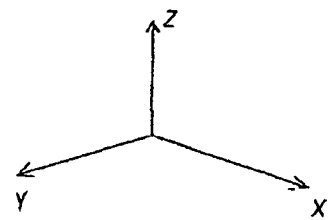
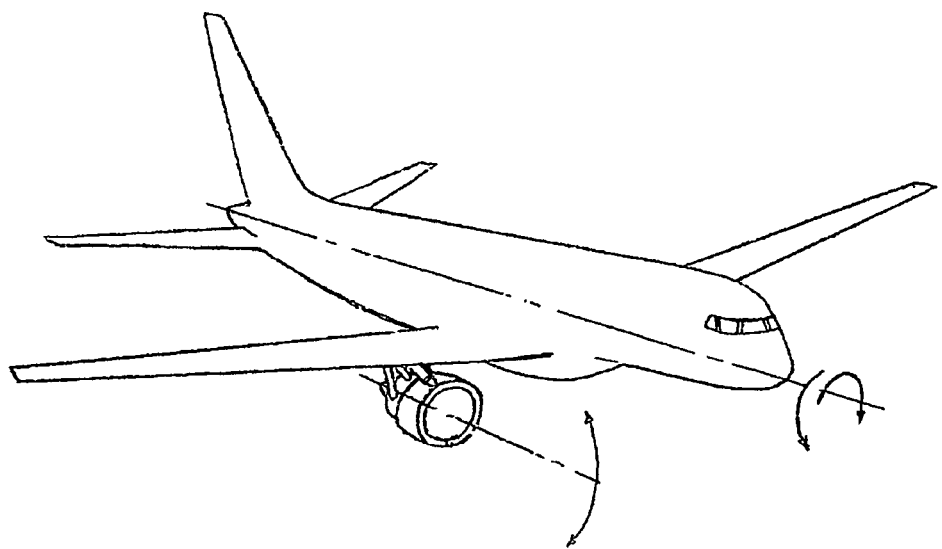
FIG. 9

UNDER THE WING-MOUNTED JET ENGINE WITH PIVOTAL SWIVEL JOINT TO PRODUCE DIRECTIONAL THRUST VECTORING THRU SWIVEL ANGLE

BACKGROUND OF THE INVENTION

Today, still one of the major problems encountered in civil aviation which for the most part utilizes jet aircraft with 2 or 4 under wing-mounted engines is the lack of moderate to agile maneuverability in takeoff, landing (ascend and descend), roll and yaw motions.

Such problem in modern military jets in service has been addressed by using TVC or thrust vectoring control to facilitate enhanced maneuvers in air and especially for short takeoff and landing.

The current state of technology built into modern fighter jet aircrafts uses thrust vectoring technique to divert the exhaust jet stream upward or downward for better agility of such jet aircrafts during takeoff and landing. In recent years turbofan engines with rotating nozzles have also been invented capable of deflecting their exhaust gas streams. In VTOL type military jet aircrafts, the deflection has been up to 90 degrees relative to the centerline of the aircraft (X-axis) which has enabled vertical takeoff. Also, the tiltrotor aircrafts use thrust vectoring by rotating the turboprop engine nacelles, although there have been complexities in such tilting mechanisms.

Some attempts for fixed optimization of engine configuration using thrust vectoring for commercial jet airliners has been made during the last decade. For example, one patent (granted to airbus industries) is limited to rear fuselage mounted jet engine aircrafts.

This invention however is related to making 2 and 4 under-wing mounted jet engine aircrafts capable of performing pitch, roll and yaw maneuvers in flight with enhanced agility over a shorter air distance, in other words I am claiming a means of enhancing/improving the agility (in adjustment of a flight attitude of such jet aircraft) by rotating the whole jet engine slightly upward or downward around a hinge point or swivel joint's local Y-axis for pitch or roll type maneuver and also rotating the plurality of jet engine assembly around engine's Z-axis outboard of the fuselage/cabin for yaw type maneuvers.

BRIEF SUMMARY OF THE INVENTION

It is understood that by manipulating the direction of thrust exhaust gases from jet engines the attitude of a jet aircraft in flight can be further controlled and enhanced. The name TVC (thrust vectoring control) refers to such possibility, which has been used primarily in military jet aircrafts for short distance landing and/or takeoff (VTOL).

This non-provisional utility invention patent application is intended for assisting a jet engine powered aircraft with two or four engines mounted under its wings (such as a passenger or commercial jet air liners) to climb, descend, perform roll, and yaw maneuvers for banking, with more agility and in a shorter air traveled distance by pivotally swiveling its jet engine(s) up, down or sideway (with jet engine thrust gases away from fuselage and cabin) and with a limited restricted range of engine swivel motion, by means of hydraulic, pneumatic, mechanical, electro-mechanical or other means and combination of such mechanisms to produce pivotal swivel motion, as further described and detailed in the drawings of this application document.

BRIEF DESCRIPTION OF THE DRAWINGS

FIG. 6 shows side view of such jet engine (14) mounted under the wing (10) of an aircraft for the purpose of showing the detail zone B captured in the perspective view in FIG. 7.

FIG. 7 shows perspective view of the detail zone B shown in FIG. 6.

FIG. 8 shows a perspective view of the detail zone A shown in FIG. 5.

FIG. 9 shows a 3D view of a jet aircraft performing roll by pivotally swinging its engine (14).

NOMENCLATURE

Figure 1:
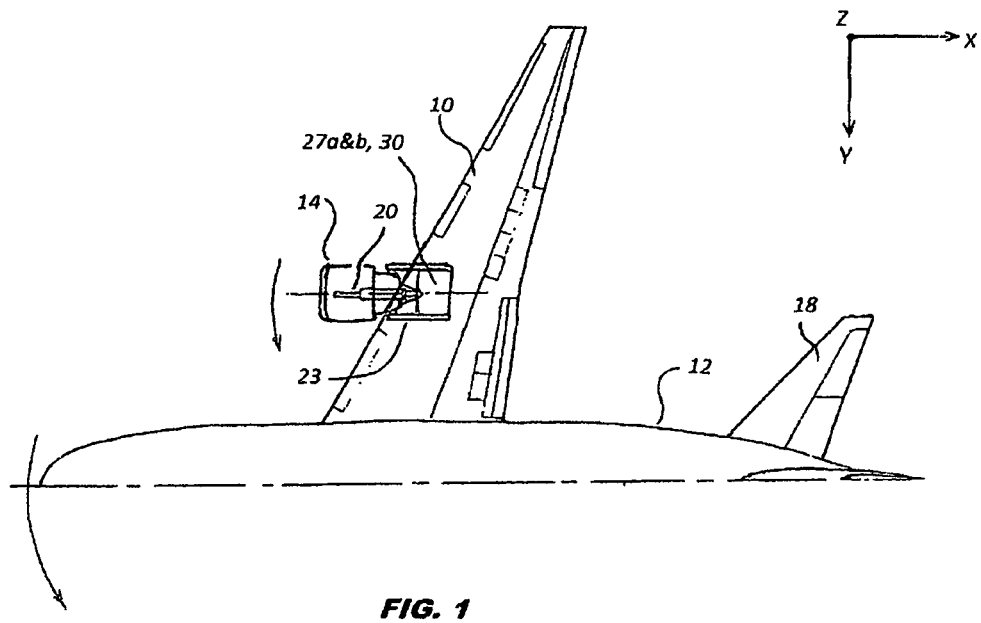
FIG. 1 shows a schematic plan view of a typical commercial jet aircraft with a configuration of the engine (14) based on the current invention.
Figure 2:
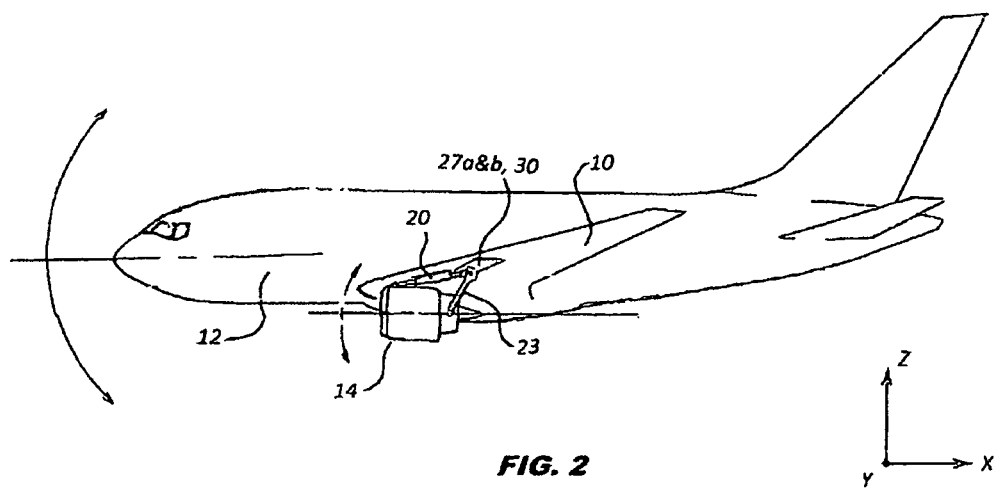
FIG. 2 shows a side elevation view of such aircraft with a schematic of the newly invented engine (14) configuration relative to the wing (10).
Figure 3:
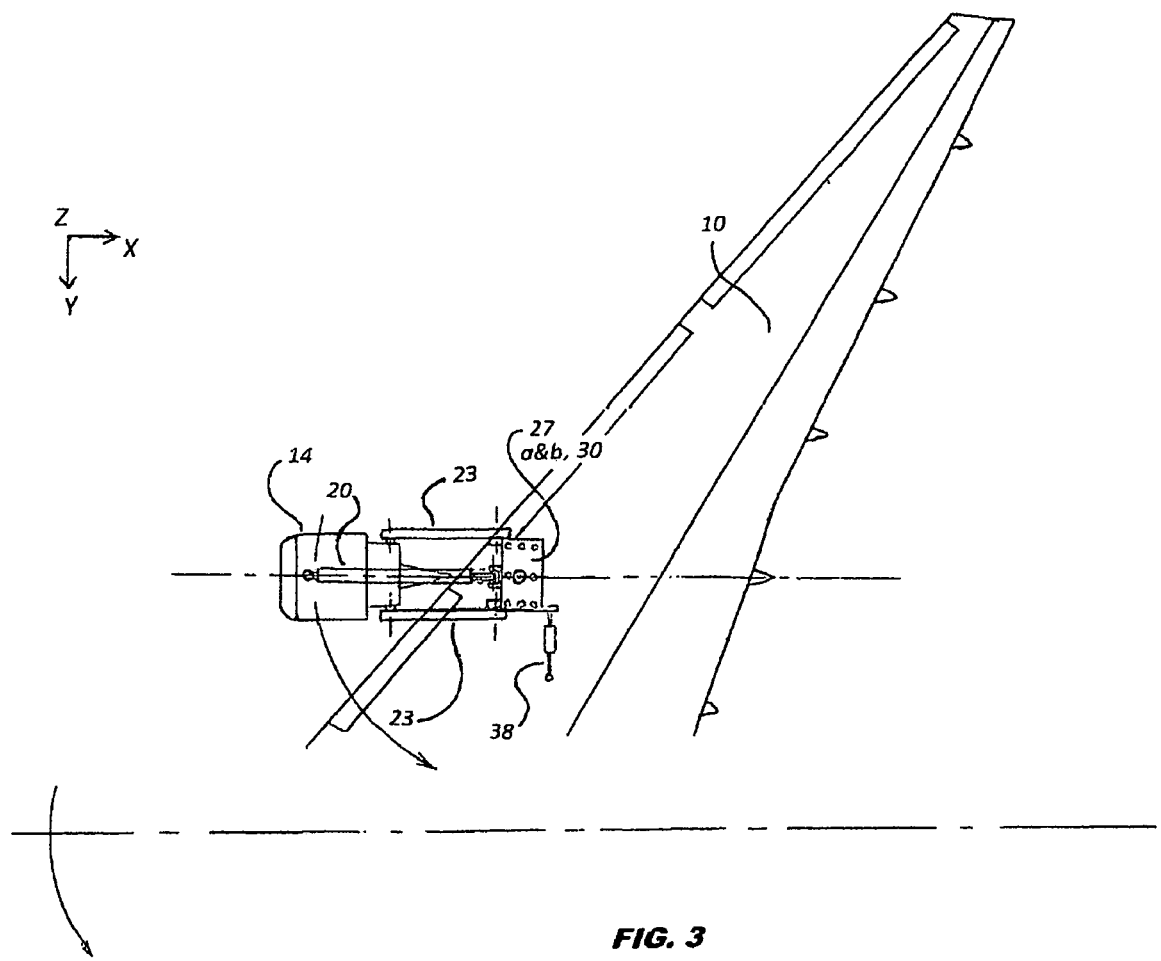
FIG. 3 shows an enlargement of the parts shown in FIG. 1, which is related to the invention for better understanding.
Figure 4:
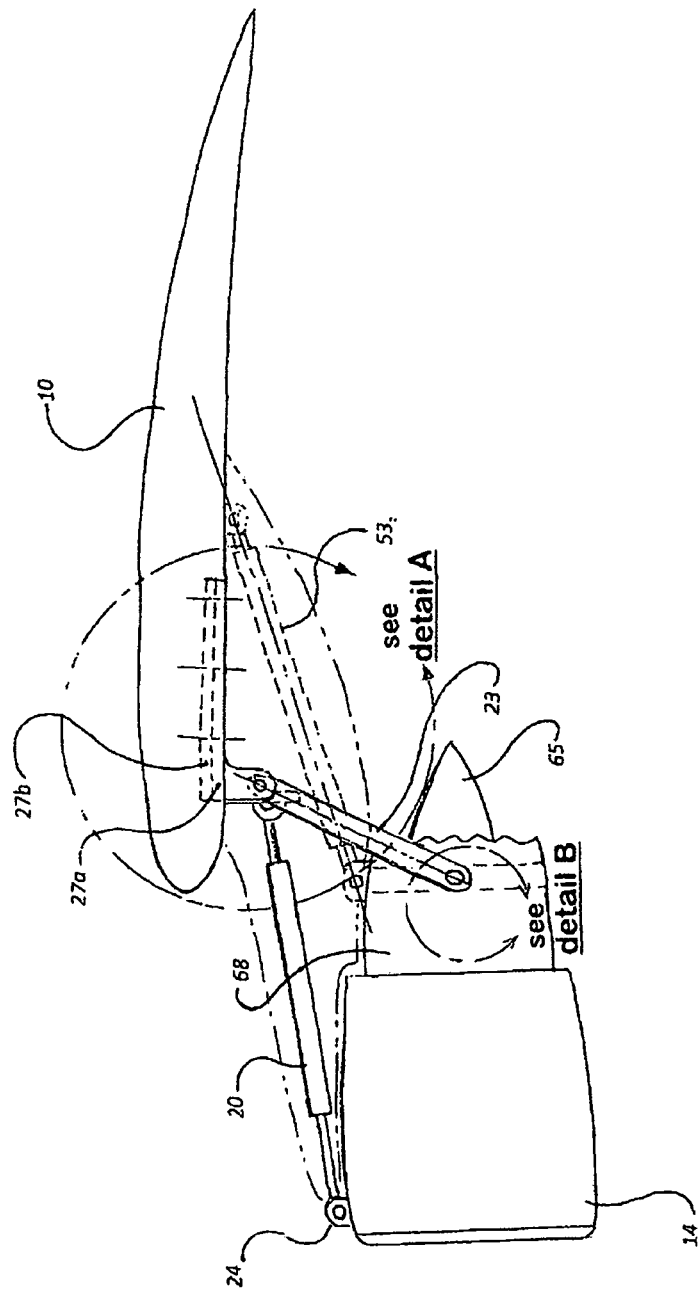
FIG. 4 shows a more detailed side elevation view of such jet engine (14) attached under the wing (10) of an aircraft showing the swivel joint (detail B), the clevises (24), the power actuated arm (20), the connecting strut providing engine weight support to the wing (53), and the plate flanges inside the wing (27a&b). The detail zones A and B reference FIGS. 7 and 8.
Figure 5:
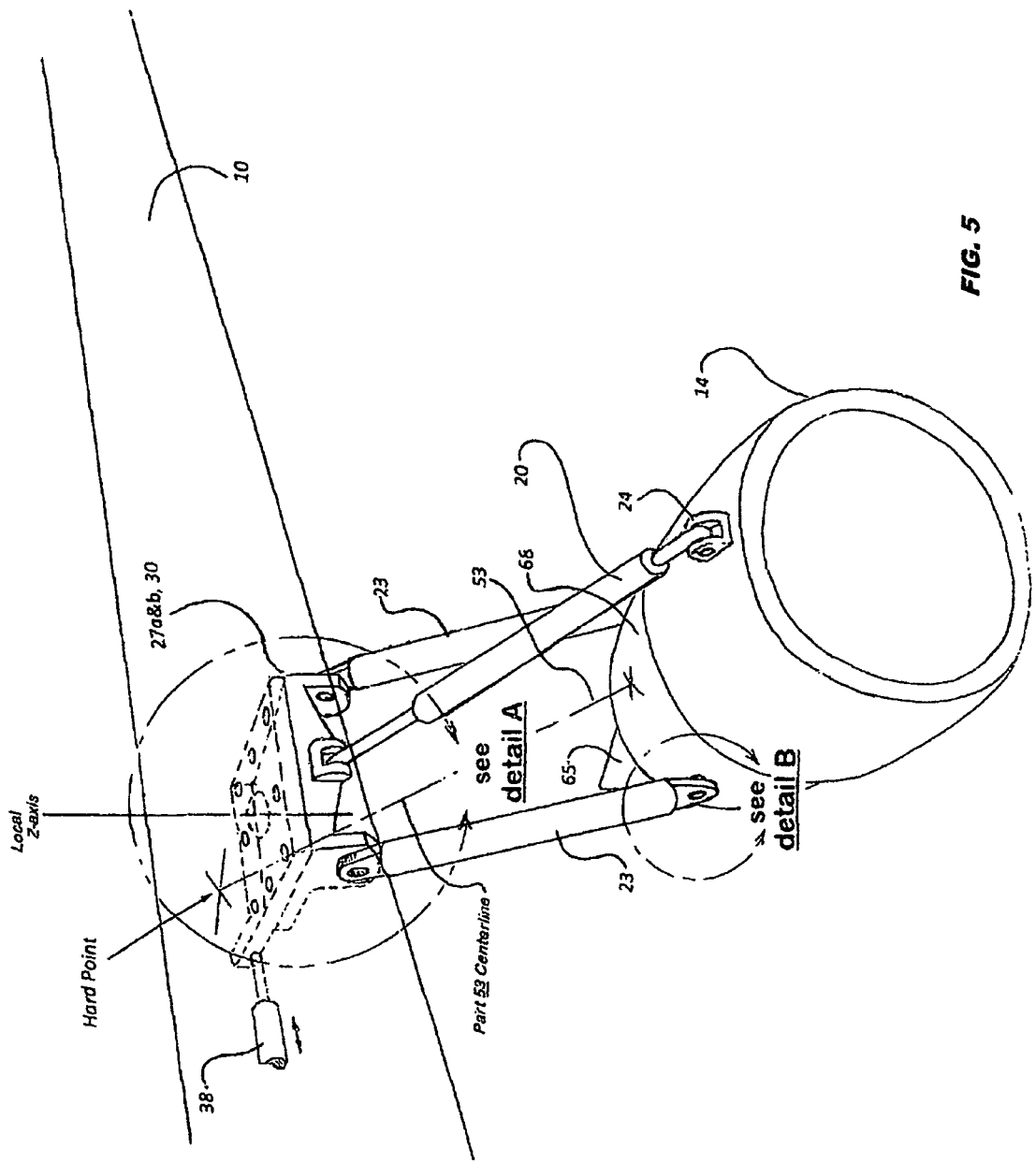
FIG. 5 shows a 3D perspective view of such jet engine (14), showing the pivot joint for swivel action about engine's Y-axis along with typical clevis (24), the power actuated arm (20), the centerline of the proposed engine support connecting strut (53), the flange plates (27a&b) providing rotation about local Z-axis and the actuator arm which will have limited/controlled range of motion using limit switch. Also, the detail zones A and B refers to FIGS. 7 and 8.
Figure 10:
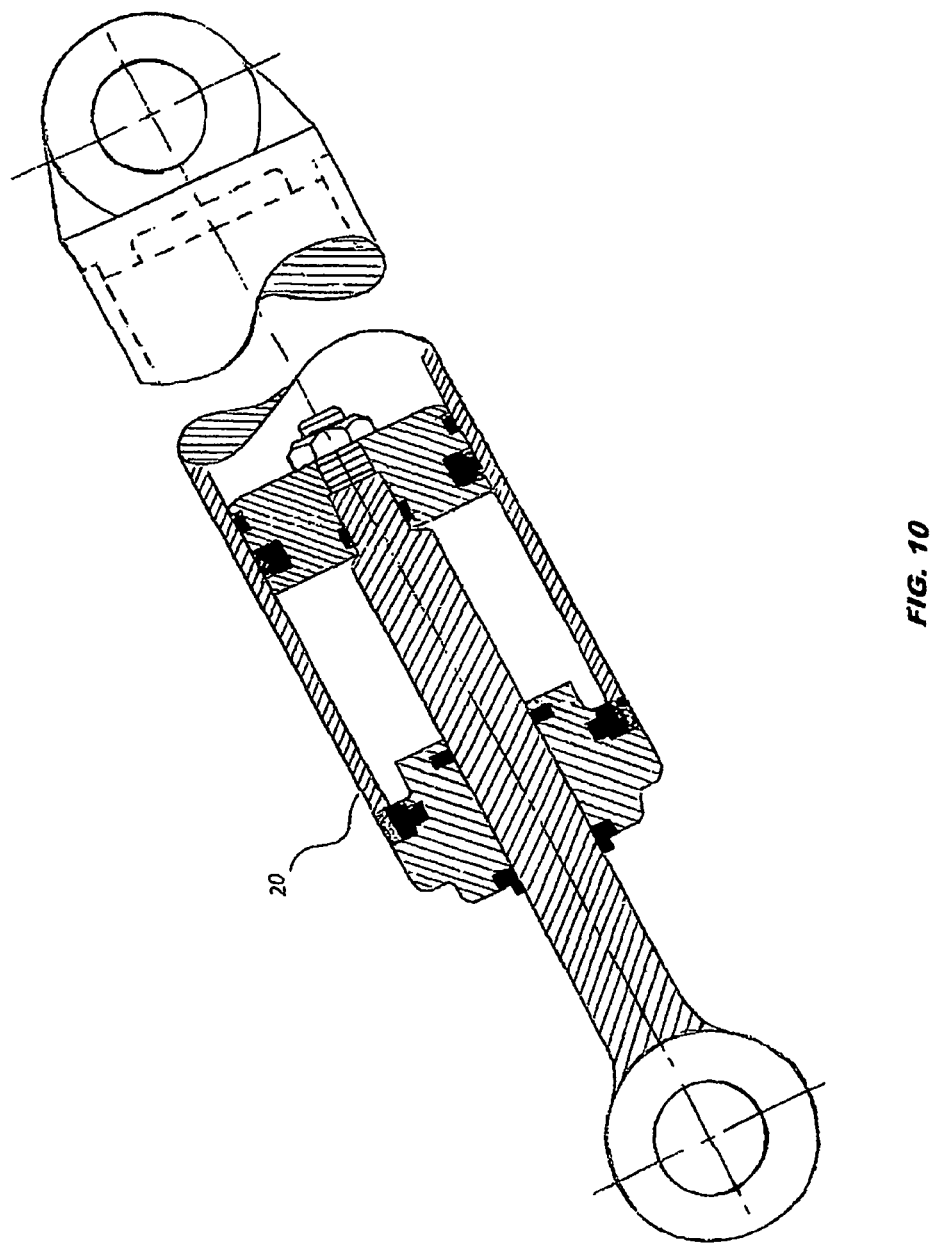
FIG. 10 shows a typical power cylinder used in part (20); other ways like power screw can also be used.

| Assigned Part No. | Part Name |
|---|---|
| 10 | Wing |
| 12 | Fuselage |
| 14 | Jet engine/Nacelle |
| 18 | Horizontal Stabilizer |
| 20 | Power-actuated cylinder/arm |
| 23 | Adjustable pivot-joint control arm |
| 24 | Clevis-Typical |
| 27a/b | Flange Plates |
| 30 | Interface Plate |
| 38 | Actuator(linear) Rod/arm |
| 43 | Bushing |
| 46 | Washer/Lock washer |
| 48 | Nut/Lock nut |
| 50 | Threaded Stud |
| 53 | Extensible Engine Load Support Connecting Strut w/universal or ball & socket type joint at the hard point end under the wing |
| 63 | Jet pipe fairing |
| 65 | Tail Cone |
| 68 | Rear Cowling door |
| 78 | Thrust Bearing |

DETAILED DESCRIPTION OF THE INVENTION

It is particularly important to be able to further control the pitch (movement of nose up or down of an aircraft) during ascend, descend, takeoff and landing, the roll (movement of an aircraft banking to the left or right), and the yaw (movement of an aircraft sideways to the right or left) of a large commercial jet aircraft with 2 or 4 engines mounted under its wings, during flight in a more agile and efficient way over a shorter air traveled distance, which at times can cause avoiding catastrophes such as mid-air collision or to avoid missing a desired flight path which can be caused by lack of adequate control over short distance by merely relying on the traditional wing or tail section aerodynamic control surfaces.

In this claim first of all the intended user is the normally larger commercial jetliners with 2 or 4 jet engines mounted under their wings, and secondly instead of using thrust reversers or by using rotating jet nozzles to tilt the exhaust gases upward or downward (as widely used in VTOL type military jet aircrafts), the pilot can pivotally swivel the entire jet engine assembly up, down or sideways and subsequently direct the jet nozzle exhaust gases to flow upward or downward (for pitch type motion, or during takeoff, landing, ascend and descend), or sideways (unidirectional, away from the cabin in certain sequence to perform yaw, which is the right or left turn motion of the jet aircraft), or by swiveling the jet engine(s) only under one wing to achieve roll (banking to the right or left) to perform more agile and efficient maneuvers by such large commercial jet aircraft.

The idea is to provide the ability to perform enhanced maneuvers in order to adjust a jet aircraft's attitude by swiveling the engine up or down (in a particular sequence discussed in the claims section of this document), about pivot points typically mounted on the primary nozzle's diffuser case or exhaust duct and past the fan turbine zone while clearing the engine core cowls on nacelle cowlings which provides access for maintenance and/or inspection, and past the thrust reverser operating zone of such aircraft, in order to achieve enhanced roll and pitch motion; or by rotating the entire engine assembly under the wing away from the fuselage/cabin to perform a more agile yaw motion in a shorter distance. This invention requires redesign of traditional pylon so that such task becomes feasible.

I claim:

1. A commercial Jet aircraft comprising: at least two jet engines (14), said jet engines (14) mounted under respective wings (10) which are connected to a fuselage (12) of said aircraft, the jet engines (14) are pivotally connected under the wings (10) of said aircraft, each engine (14) pivotally connected to said respective wing (10) by a plurality of flange plates (27a/b), and an interface plate (30) mounted beneath said respective wing (10), with a plurality of adjustable pivot-point control arms (23), a power cylinder (20), and support struts (53); wherein the control arms (23) each connect a respective one of the flange plates (27a/b) to a rear side end portion of the respective engine (14) and the power cylinder (20) connects the respective one of the flange plates (27a/b) to a front top portion of the respective engine (14).

2. The aircraft as set forth in claim 1, wherein the aircraft is configured to perform maneuvers like roll, pitch and yaw during flight by said engines (14) configured to angularly rotate with respect to a longitudinal axis of the fuselage (12) as each said engine (14) is able to swivel to a controlled/restrained and limited range of motion upward, downwards or sideways about pivot points located on each respective control arm (23) by pilot command, to direct exhaust gases up, down, or sideways via rotation of said flange plates (27a/b), and relative to the longitudinal axis of the fuselage (12) selectively and in proper sequence to perform agile attitude change maneuvers of the aircraft in flight, performing agile ascend/takeoff, descend/landing or to perform roll type/banking to a left or right in-flight by selective swiveling of the engines (14) or by pivotally rotating the engines (14) about a local Z-axis of the said engines (14) mounted under the wings (10) to achieve agile yaw type motion for aircraft's attitude and flight path change as needed.

3. The aircraft as set forth in claim 1, wherein each said engine (14) has nacelle housing, cowl doors (68) for maintenance & inspection access, a nozzle downstream of a low-pressure turbine with a jet pipe (63) and tail cone (65).

4. The aircraft as set forth in claim 1, wherein the power cylinder (20) is one of: a hydraulic type, a pneumatic type, a mechanical type, an electrical type or a combination thereof.

5. The aircraft as set forth in claim 1, wherein an amount of each said jet engines (14) ability to swing upward or downward during ascend/takeoff or descend/landing for pitch or roll type maneuvers, or to rotate side to side for yaw motions to allow for rotation of said engine (14) away from the fuselage (12) is restricted to a limited number of degrees using at least one an electrical limit switch or a mechanical switch to a predetermined number of degrees to avoid any excessive maneuvers, to not cause turbulent air flow into an inlet of said engines (14) and to not cause abrupt aircraft movements; the aircraft being configured to swivel one or more of the downward to an angular degree.

6. The aircraft as set forth in claim 1, wherein the aircraft has a flight path control regime controlled thru jet said engines (14) for ascend/descend or takeoff/landing, said engines (14) on both said wings (10) configured to swivel upward to a limited angle <10 degrees, or swivel downward to a restricted/limited amount and for rolling to a right or to a left, one or more of said engines (14) configured to swivel upward to a limited angle; for yaw to the right or to the left, the plurality of the one or more engines (14) are configured to rotate away or towards the fuselage (12) to a limited range, by swiveling said engines (14) mounted under the respective wing (10) about a local Z-axis of the engine (14) by actuating a linear actuator arm (38).

* * * * *